United States Patent
Seok (10) Patent No.: US 9,706,529 B2
(45) Date of Patent: Jul. 11, 2017

(54) METHOD AND APPARATUS FOR TRANSMITTING AND RECEIVING DATA IN MULTI-BSS

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 14/765,120

(22) PCT Filed: Feb. 5, 2014

(86) PCT No.: PCT/KR2014/000972
§ 371 (c)(1),
(2) Date: Jul. 31, 2015

(87) PCT Pub. No.: WO2014/123349
PCT Pub. Date: Aug. 14, 2014

(65) Prior Publication Data
US 2015/0373685 A1    Dec. 24, 2015

Related U.S. Application Data (60) Provisional application No. 61/761,725, filed on Feb. 7, 2013.

(51) Int. Cl.
*H04W 72/04* (2009.01)
*H04W 74/00* (2009.01)
(Continued)

(52) U.S. Cl.
CPC .......... *H04W 72/0406* (2013.01); *H04L 5/00* (2013.01); *H04W 74/002* (2013.01);
(Continued)

(58) Field of Classification Search
CPC ............. H04W 84/12; H04W 72/0453; H04W 74/0816; H04W 16/14; H04W 88/08
See application file for complete search history.

(56) References Cited

U.S. PATENT DOCUMENTS

| 2011/0044273 A1 | 2/2011 | Maltsev et al. |
| 2012/0082040 A1* | 4/2012 | Gong ................ H04W 74/0816 370/252 |

(Continued)

FOREIGN PATENT DOCUMENTS

| KR | 10-2012-0068689 | 6/2012 |
| KR | 10-2012-0127833 | 11/2012 |

OTHER PUBLICATIONS

PCT International Application No. PCT/KR2014/000972, Written Opinion of the International Searching Authority dated May 20, 2014, 1 page.

*Primary Examiner* — Jung Park
(74) *Attorney, Agent, or Firm* — Lee Hong Degerman Kang & Waimey (57) ABSTRACT

A communication method for an AP comprises the step of: the AP receiving multiple RTS frames from each of multiple STAs through each of multiple channels; the AP transmitting multiple CTS frames to the multiple STAs through each of multiple available channels from among the multiple channels; and the AP receiving multiple uplink data frames transmitted from each of the multiple STAs through each of the multiple available channels, wherein the AP communicates with the multiple STAs based on BSS1 and BSS2, wherein the BSS1 includes a primary channel band1 and secondary channel band1, the BSS2 includes a primary channel band2 and secondary channel band2, wherein the primary channel band1 overlaps with the secondary channel band2, the secondary channel band1 overlaps with the primary channel band2, and wherein the multiple channels (Continued)

can be included in the primary channel band1 and secondary channel band1.

10 Claims, 9 Drawing Sheets (51) Int. Cl.
*H04L 5/00* (2006.01)
*H04W 74/08* (2009.01)
*H04W 84/12* (2009.01)
*H04W 88/08* (2009.01)

(52) U.S. Cl.
CPC ........ *H04W 74/0816* (2013.01); *H04W 84/12* (2013.01); *H04W 88/08* (2013.01)

(56) References Cited

U.S. PATENT DOCUMENTS

| | | | |
|---|---|---|---|
| 2012/0157151 A1* | 6/2012 | Chu | H04W 52/40 455/522 |
| 2012/0207036 A1 | 8/2012 | Ong et al. | |
| 2012/0243485 A1* | 9/2012 | Merlin | H04W 28/20 370/329 |
| 2014/0092860 A1* | 4/2014 | Kneckt | H04W 72/1205 370/329 |
| 2015/0319700 A1* | 11/2015 | Oteri | H04W 52/10 455/127.1 |
| 2015/0359008 A1* | 12/2015 | Wang | H04W 74/004 370/330 |

* cited by examiner

METHOD AND APPARATUS FOR TRANSMITTING AND RECEIVING DATA IN MULTI-BSS

CROSS-REFERENCE TO RELATED APPLICATIONS

This application is the National Stage filing under 35 U.S.C. 371 of International Application No. PCT/KR2014/000972, filed on Feb. 5, 2014, which claims the benefit of U.S. Provisional Application No. 61/761,725, filed on Feb. 7, 2013, the contents of which are all hereby incorporated by reference herein in their entirety.

BACKGROUND OF THE INVENTION

Field of the Invention

The present invention relates to a wireless local area network (WLAN) and, more particularly, to a method of transmitting and receiving data in a BSS.

Related Art

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of a high efficiency WLAN (HEW) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the HEW operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the HEW, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the HEW, improvement of system performance in an overlapping basic service set (OBSS) environment and improvement of outdoor environment performance, and cellular offloading are anticipated to be actively discussed rather than improvement of single link performance in one basic service set (BSS). Directionality of the HEV means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

The present invention provides a method for transmitting and receiving data in a multi-BSS.

The present invention provides an apparatus for performing the method for transmitting and receiving data in a multi-BSS.

In an aspect, a communication method for an access point (AP) in a wireless local area network (WLAN) comprises: receiving, by the AP, a plurality of RTS frames from each of a plurality of STAs through each of a plurality of channels; transmitting, by the AP, a plurality of CTS frames to the plurality of STAs through each of a plurality of available channels among the plurality of channels; and receiving, by the AP, a plurality of uplink data frames transmitted from each of the plurality of STAs through each of the plurality of available channels, wherein the AP communicates with the plurality of STAs based on a first basic service set (BSS) and a second BSS, wherein the first BSS includes a first main channel band and a first sub channel band, wherein the second BSS includes a second main channel band and a second sub channel band, wherein the first main channel band overlaps with the second sub channel band and the first sub channel band overlaps with the second main channel band, and wherein the plurality of channels are included in the first main channel band and the first sub channel band.

In another aspect, An access point (AP) performing downlink transmission in a wireless local area network (WLAN) comprises a radio frequency (RF) unit configured to transmit and receive a radio signal and a processor configured to: receive a plurality of RTS frames from each of a plurality of STAs through each of a plurality of channels, transmit a plurality of CTS frames to the plurality of STAs through each of a plurality of available channels among the plurality of channels, and receive a plurality of uplink data frames transmitted from each of the plurality of STAs through each of the plurality of available channels, wherein the AP communicates with the plurality of STAs based on a first basic service set (BSS) and a second BSS, wherein the first BSS includes a first main channel band and a first sub channel band, wherein the second BSS includes a second main channel band and a second sub channel band, wherein the first main channel band overlaps with the second sub channel band and the first sub channel band overlaps with the second main channel band, and wherein the plurality of channels are included in the first main channel band and the first sub channel band.

A method of independently transmitting and receiving data between an extension AP supporting an existing legacy channel band and a newly defined extension channel band and a legacy STA supporting an existing legacy channel band and an extension STA supporting an existing legacy channel band and a newly defined extension channel band may be performed. Accordingly, data throughput and frequency efficiency may be improved using a newly extended channel band.

DESCRIPTION OF EXEMPLARY EMBODIMENTS

Figure 1:
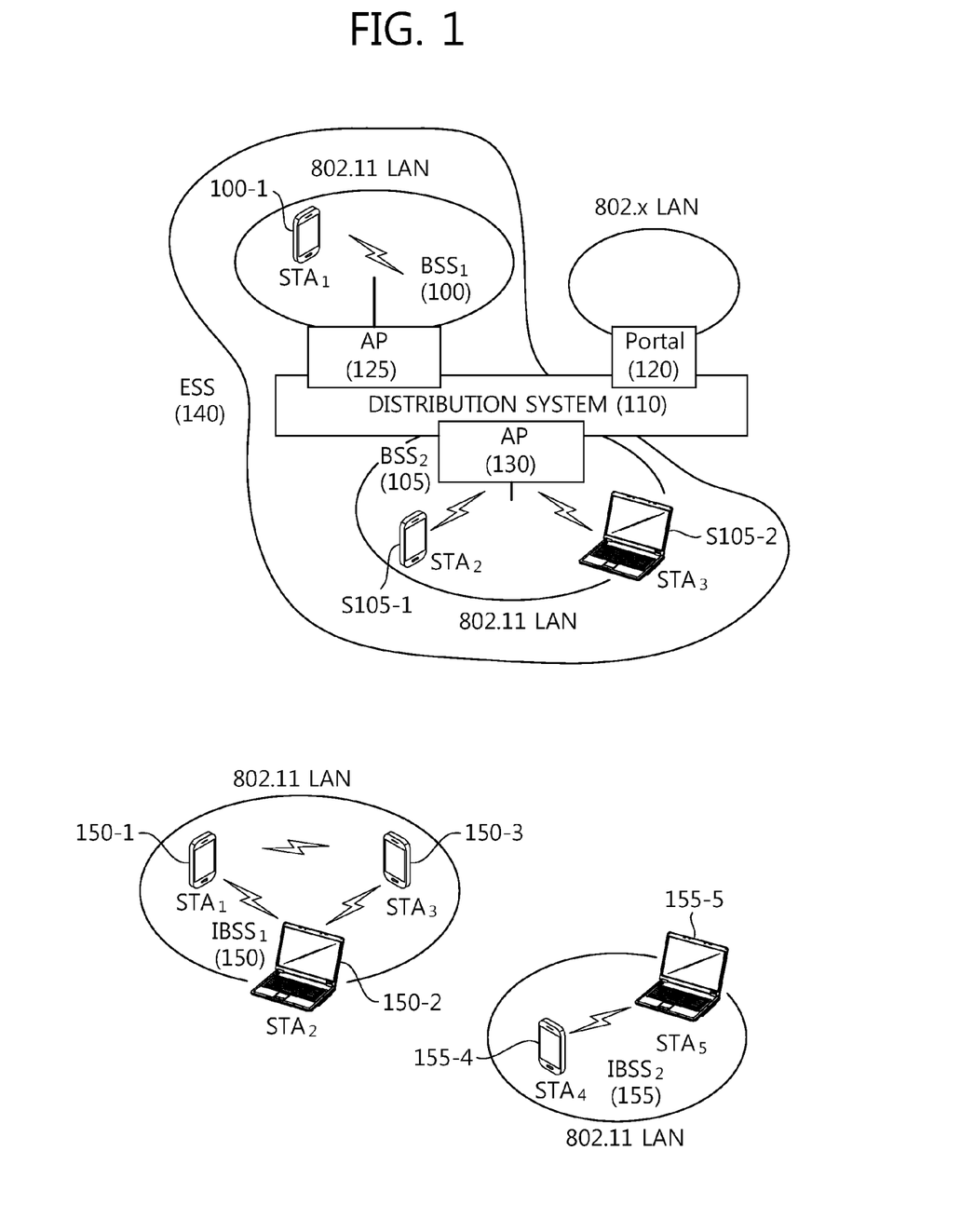
FIG. 1 is a conceptual diagram illustrating a configuration of a wireless local area network (WLAN).

FIG. 1 is a concept view illustrating the structure of a wireless local area network (WLAN).

An upper part of FIG. 1(A) shows the structure of the IEEE (institute of electrical and electronic engineers) 802.11 infrastructure network.

Referring to the upper part of FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
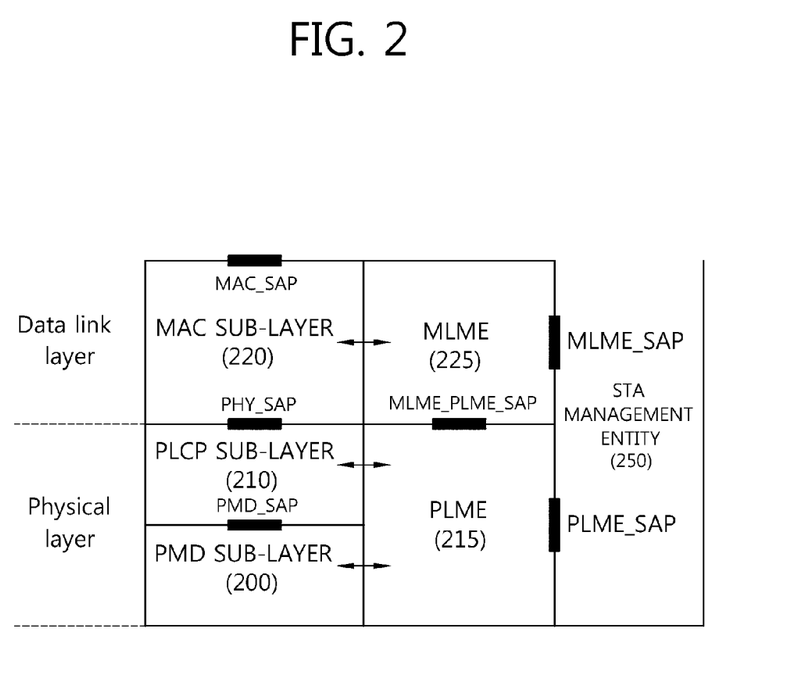
FIG. 2 is a diagram illustrating a tier-architecture in a WLAN system supported by an IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
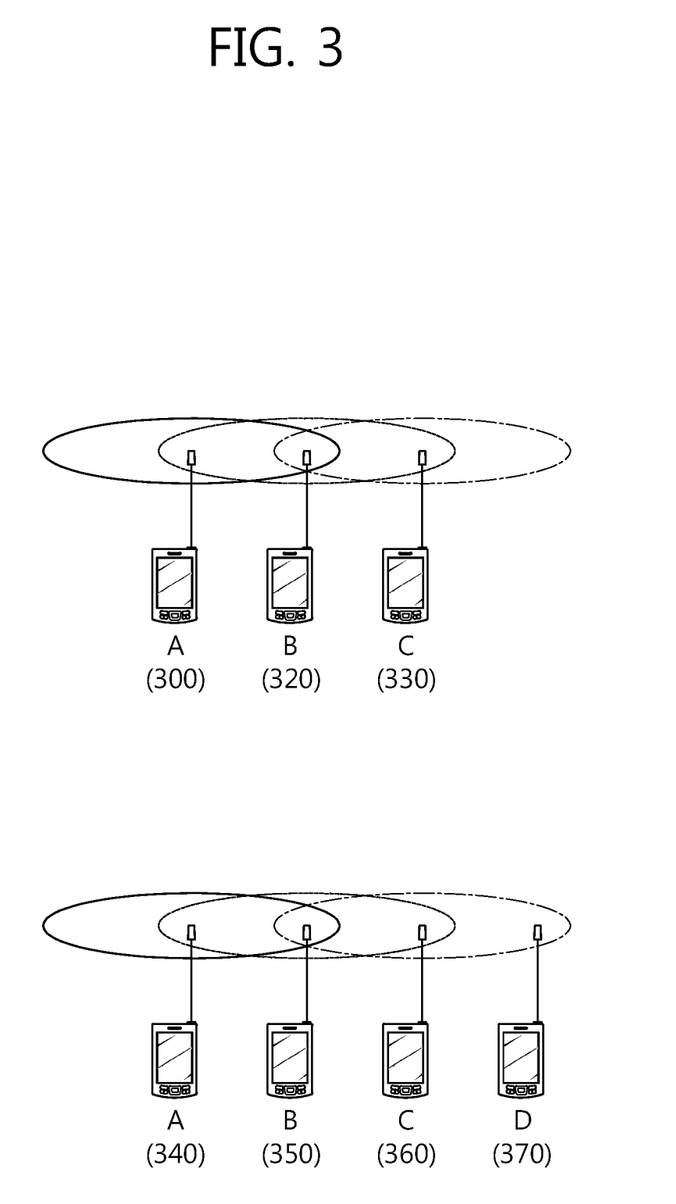
FIG. 3 is a conceptual diagram illustrating a problem which may occur when the STA detects a medium.

FIG. 3 is a conceptual diagram illustrating an issue which may occur when the STA senses a medium.

An upper end of FIG. 3 illustrates a hidden node issue and a FIG. 3(B) illustrates an exposed node issue.

At the upper end of FIG. 3, it is assumed that an STA A 300 and an STA B 320 transmit and receive current data and an STA C 330 and an STA B 320 has data to be transmitted. When the data is transmitted and received between the STA A 300 and the STA B 320, a specific channel may be busy. However, when the STA C 330 carrier-senses a medium before transmitting the data to the STA B 320 due to transmission coverage, the STA C 330 may determine that the medium for transmitting the data to the STA B 320 is in an idle state. When the STA C 330 determines that the medium is in the idle state, the data may be transmitted from the STA C 330 to the STA B 320. Consequently, since the STA B 320 simultaneously receives information of the STA A 300 and the STA C 330, a collision of data occurs. In this case, the STA A 300 may be a hidden node as the STA C 330.

At a lower end of FIG. 3, it is assumed that an STA B 350 transmits data to an STA A 340. When an STA C 360 intends to transmit data to an STA D 370, the STA C 360 may perform carrier sensing in order to find whether the channel is busy. The STA C 360 may sense that the medium is busy due to transmission coverage of the STA B 350 because the STA B 350 transmits information to the STA A 340. In this case, although the STA C 360 intends to transmit data to the STA D 370, since it is sensed that the medium is busy, the STA C 360 may not transmit the data to the STA D 370. Until it is sensed that the medium is idle after the STA B 350 completes transmitting the data to the STA A 340, a situation in which the STA C 360 needs to unnecessarily wait occurs. That is, although the STA A 340 is out of a carrier sensing range of the STA C 360, the STA A 340 may prevent data transmission by the STA C 360. In this case, the STA C 360 becomes an exposed node of the STA B 350.

In order to solve the hidden nose issue disclosed at the upper end of FIG. 3 and the exposed node issue disclosed at the lower end of FIG. 3, it may be sensed whether the medium is busy by using an RTS frame and a CTS frame in a WLAN.

Figure 4:
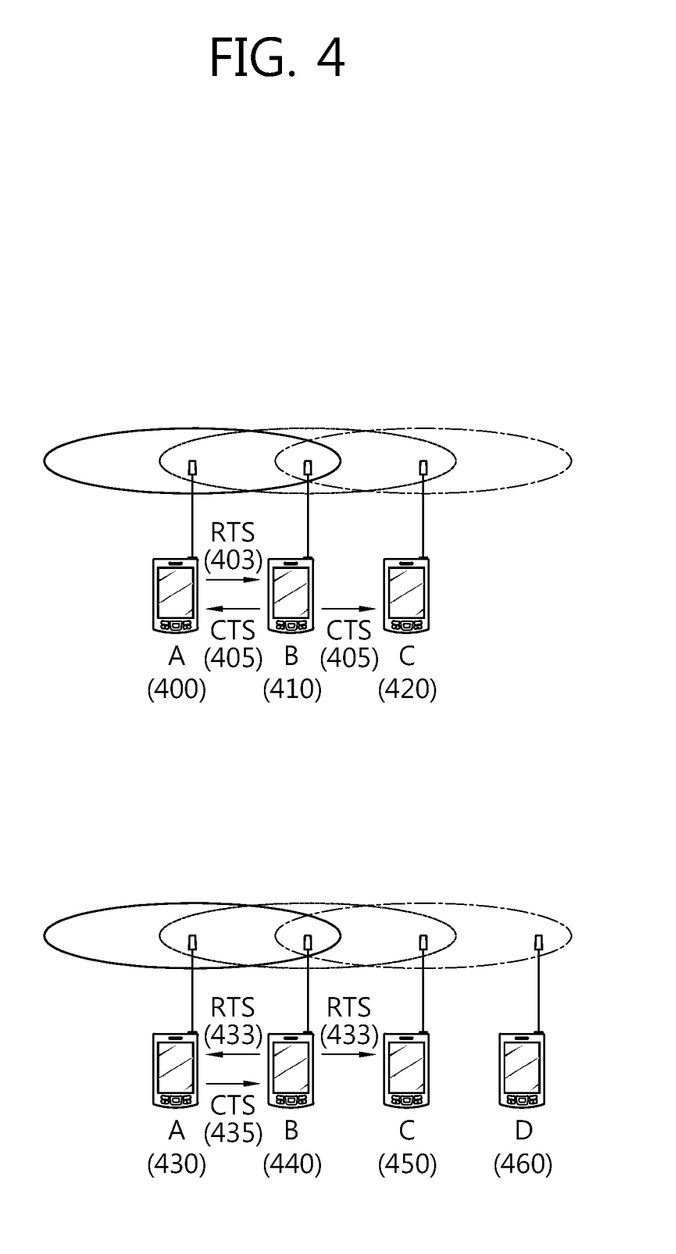
FIG. 4 is a conceptual diagram illustrating a method for transmitting and receiving an RTS frame and a CTS frame in order to solve a hidden node problem and an exposed node problem

FIG. 4 is a conceptual diagram illustrating a method for transmitting and receiving the RTS frame and the CTS frame in order to solve the hidden node issue and the exposed node issue.

Referring to FIG. 4, short signaling frames such as the request to send (RTS) frame and the clear to send (CTS) frame may be used in order to solve the hidden node issue and the exposed node issue. It may be overheard whether data is transmitted and received among neighboring STAs based on the RTS frame and the CTS frame.

An upper end of FIG. 4 illustrates a method for transmitting an RTS frame 403 and a CTS frame 405 in order to solve the hidden node issue.

Assumed that both an STA A 400 and an STA C 420 intend to transmit data to an STA B 410, when the STA A 400 sends the RTS frame 403 to the STA B 410, the STA B 410 may transmit the CTS frame 405 to both the STA A 400 and the STA C 420 therearound. The STA C 420 that receives the CTS frame 405 from the STA B 410 may obtain information indicating that the STA A 400 and the STA B 410 are transmitting data. Further, the RTS frame 403 and the CTS frame 405 include a duration field including information on a busy duration of a radio channel to configure a network allocation vector (NAV) during a predetermined duration so as to prevent the STA C 420 from using the channel.

The STA C 420 waits until the transmission and reception of the data between the STA A 400 and the STA B 410 is completed, and as a result, the STA C 420 may avoid the collision at the time of transmitting the data to the STA B 410.

A lower end of FIG. 4 illustrates a method for transmitting an RTS frame 433 and a CTS frame 435 in order to solve the exposed node issue.

An STA C 450 overhears transmission of the RTS frame 433 and the CTS frame 435 of an STA A 430 and an STA B 440, and as a result, the STA C 450 may find that no collision occurs in spite of transmitting the data to another STA D 460. That is, the STA B 440 transmits the RTS frame 433 to all neighboring terminals and transmits the CTS frame 435 to only the STA A 430 to which the STA B 440 needs to actually transmit data. Since the STA C 450 receives only the RTS frame 433 and may not receive the CTS frame 435 of the STA A 430, it may be found that the STA A 430 is out of a carrier sensing range of the STA C 450. Accordingly, the STA C 450 may not transmit data to the STA D 460.

An RTS frame format and a CTS frame format are disclosed in 8.3.1.2 RTS frame format and 8.3.1.3 CTS frame format of "IEEE Standard for Information Technology Telecommunications and information exchange between systems Local and metropolitan area networks Specific requirements Part 11: Wireless LAN Medium Access Control (MAC) and Physical Layer (PHY) Specifications which is IEEE Draft P802.11-REVmb™/D12 opened in November 2011.

The IEEE 802.11 WLAN (wireless local area network, WLAN) standard may have different transmission rate in various bands. A very high throughput (VHT) system which is the IEEE 802.11ac standard is to provide a throughput of 1 Gbps or more at a MAC service access point (SAP).

To this end, the VHT system may support a channel bandwidth of 80/160 MHz and 8 spatial streams. When the channel bandwidth of 160 MHz, 8 spatial streams, 256 QAM, and a short guard interval (GI) are all implemented, the VHT system may provide a maximum of 6.9 Gbps transmission rate.

However, VHT STAs that support multiple VHT systems need to simultaneously use the channel in order for an aggregated throughput of a VHT BSS to satisfy 1 Gbps in an actual environment.

An AP that supports a VHT may use space division multiple access (SDMA) or multi user-multiple input multiple output (MU-MIMO) as a method for transmitting data in order for the STAs supporting the multiple VHT systems to simultaneously use the channel. That is, the VHT systems may simultaneously transmit and receive different data among the multiple VHT STAs and the VHT AP based on multiple spatial streams.

In the VHT system, since legacy stations (STAs) supporting IEEE 802.11a/n are widely used in transmitting data by using the channel bandwidth of 160 MHz.

Accordingly, non-contiguous channels need to be aggregated and used.

Figure 5:
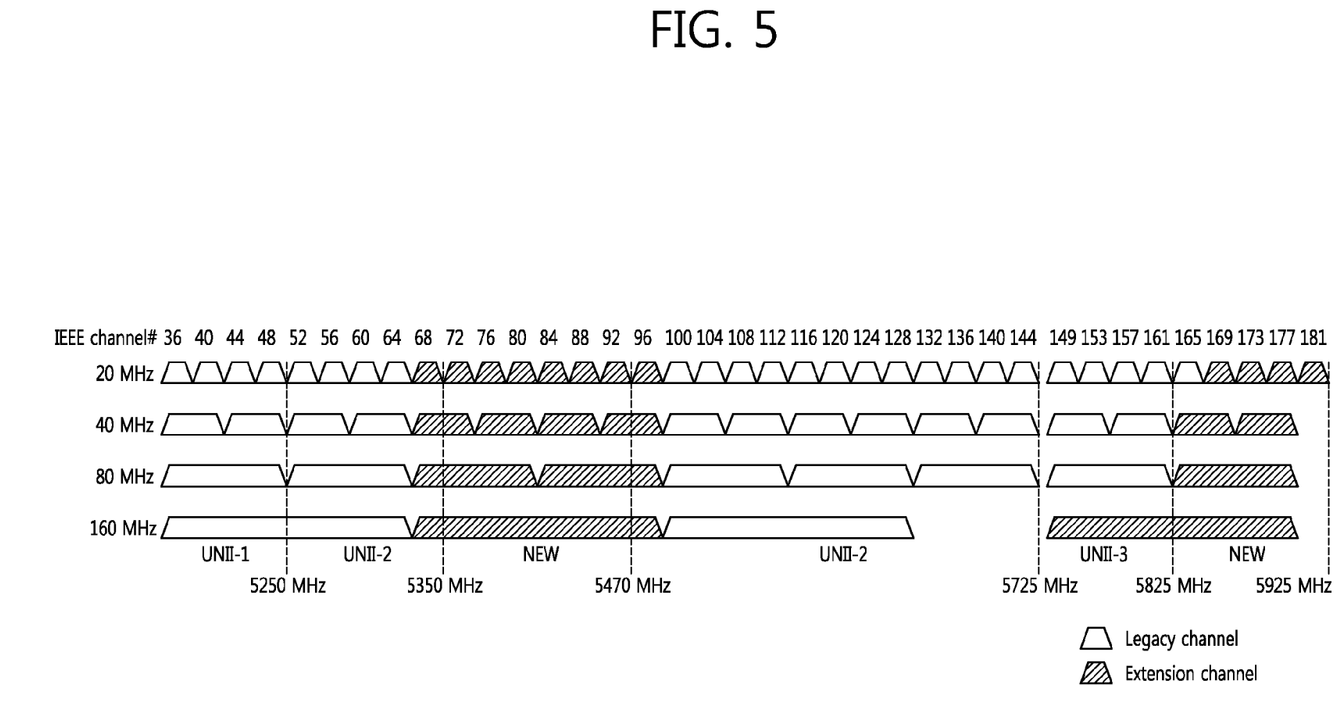
FIG. 5 is a conceptual diagram illustrating information on a bandwidth of the WLAN.

FIG. 5 is a conceptual diagram illustrating information on the bandwidth of the WLAN.

With the increase in demand for high-definition multimedia transmission, a channel bandwidth for the WLAN has been extended.

Referring to FIG. 5, channel bands which the IEEE 802.11ac may currently use and bands to be newly added in a frequency band of 5 GHz are illustrated.

When channel bands to be newly allocated for the WLAN in channel bands of 5350 MHz to 5470 MHz and 5825 MHz to 5925 MHz are considered, the number of channel bands which may be used by the STA or AP may increase. For example, referring to the 80 MHz channel band, 80 MHz channel bands which are usable may increase from 6 channels at present to 9 channels by allocating the new channel bands. As another example, referring to the 160 MHz channel band, 160 MHz channel bands which are usable may increase from 2 channels at present to 4 channels.

The legacy STA (e.g., the STA supporting the IEEE 802.11a/n/ac) in the related art, which operates at 5 GHz does not support the newly allocated channels. Accordingly, the AP that supports the newly allocated channels configures a primary channel as a channel in which the legacy STA may operate to support the legacy STA.

Hereinafter, an embodiment of the present invention discloses channel bands allocated to 5 GHz by defining the channel bands allocated to 5 GHz as two types of channel bands. An existing channel supported by a legacy STA as in IEEE 802.11a/n/ac is defined as a legacy channel band. A channel band newly allocated to 5 GHz is defined as an extension channel band. Further, an operable STA at an extension channel band is defined as an extension STA.

Hereinafter, an embodiment of the present invention discloses a method of transmitting and receiving data between an AP supporting a plurality of BSS operation (multi BSS operation) and a legacy STA and an extension STA based on a legacy channel band and an extension channel band of a 5 GHz band. The AP may transmit and receive data to and from the STA by implementing a plurality of BSSs.

An embodiment of the present invention discloses a multi-BSS operation method for efficiently using an extension channel band which is newly extended at a frequency band of 5 GHz.

A multi-BSS operation method according to an embodiment of the present invention may include a method of configuring a plurality of BSSs to simultaneously provide a service to at least one STA using a plurality of BSS by the AP. Hereinafter, it is assumed that an AP is an AP capable of supporting a multi-BSS operation method. For example, the AP may operate by configuring a first BSS and a second BSS according to a channel band. Each BSS may separately define a primary channel. For example, a primary channel of a first BSS may be included in a first channel band, and a primary channel of the second BSS may be included in a second channel.

In this case, a first STA included in a first BSS accesses the AP through a first channel band and a second STA included in a second BSS accesses the AP through a second channel band. Inclusion of the STA in a specific BSS may mean a case where the STA configures a primary channel of an STA (STA primary channel) in a primary channel of a specific BSS. For example, the first STA may perform a competition based access using a back-off mechanism based on carrier sense multiple access/collision avoidance (CSMA/CA) at an STA primary channel of a first channel band. In the same manner, the second STA may perform a competition based access using a back-off mechanism based on the CSMA/CA at an STA primary channel of a second channel. The operation of the STA will be described in detail.

That is, an AP capable of supporting the multi-BSS operation may operate so that data may be transmitted and received between the AP and the second STA simultaneously with at a time when transmission and reception of the data are achieved between the AP and the first STA. Hereinafter, the embodiment of the present invention discloses an operation of an AP capable of supporting the multi-BSS operation in detail.

Figure 6:
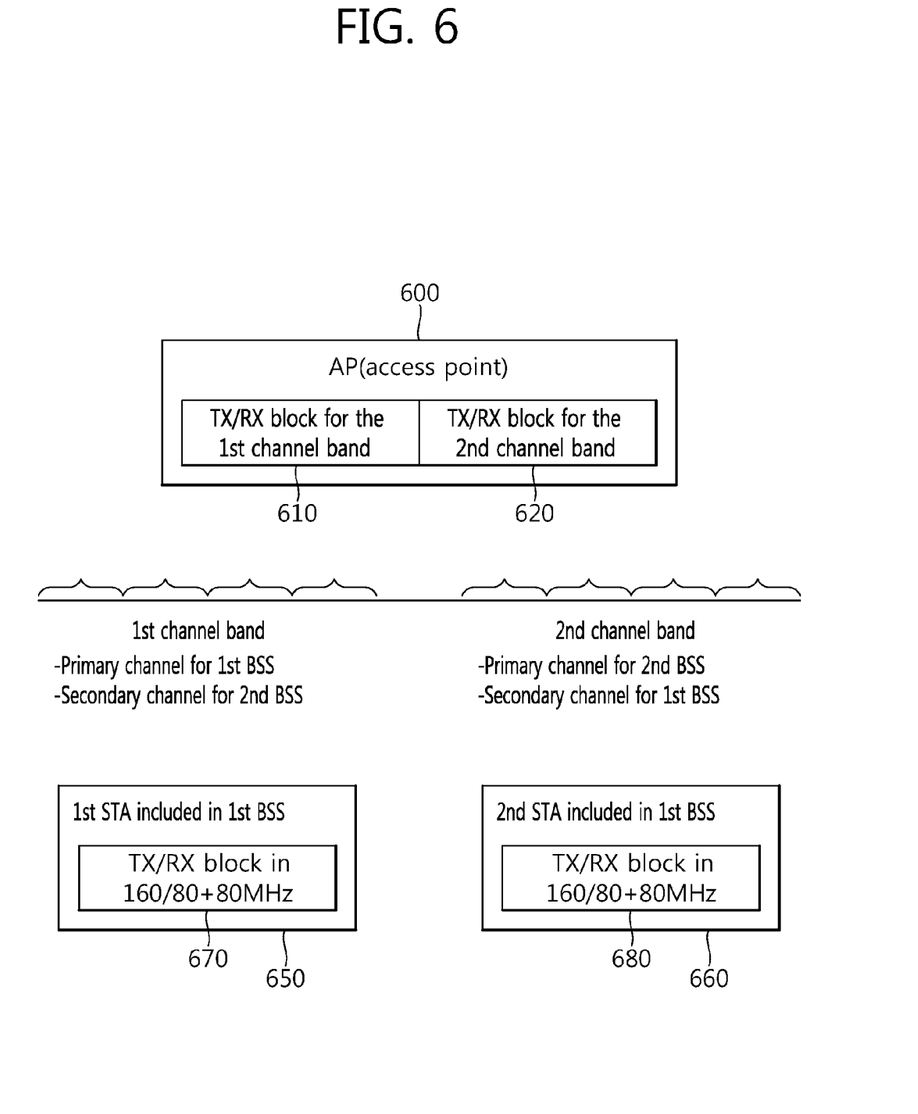
FIG. 6 is a conceptual diagram illustrating an operation of an AP which may support a multi-BSS operation according to an embodiment of the present invention.

FIG. 6 is a conceptual diagram illustrating an operation of an AP which may support a multi-BSS operation according to an embodiment of the present invention.

Referring to FIG. 6, an AP 600 may transmit and receive data to and from STAs 650 and 660 based on a 5 GHz frequency band including two 80 MHz channel bandwidths. One 80 MHz channel bandwidth may refer to a first channel band, and a remaining one 80 MHz channel bandwidth may refer to a second channel band. It is assumed that the first channel band is a legacy channel band and a second channel band is an extension band.

The AP 600 supporting the multi-BSS operation may transmit and receive data based on at least two TX/RX blocks 610 and 620. A plurality of TX/RX blocks 610 and 620 may be a constituent element configured to separately transmit and receive the data at different channel bands. Hereinafter, the embodiment of the present invention is described on the assumption that an AP 600 supporting a multi-BSS operation is configured based on two TX/RX blocks 610 and 620.

A TX/RX block configured to be operated at a first channel band may be defined as a first TX/RX block 610. A TX/RX block configured to be operated at a second channel band may be defined as a second TX/RX block 620. According to an embodiment of the present invention, the TX/RX block 610 and the second TX/RX block 620 may be independently operated. For example, the TX/RX block 610 may transmits data to the STA and the second TX/RX block 620 may receive the data from another STA.

The AP 600 may configure two BSS based on the first TX/RX block 610 and the second TX/RX block 620. Each BSS may perform an operation by configuring one channel bandwidth as a primary channel and configuring a remaining channel bandwidth as a secondary channel. The primary channel of the specific BSS may be a second channel of another BSS. In the same manner, the secondary channel of the specific BSS may be a primary channel of another BSS. The primary channel may be expressed as a main channel, and a second channel may be expressed as a sub-channel.

For example, the first BSS may configure a first channel band corresponding to a legacy channel as a primary channel and may configure a second channel band being a remaining channel band corresponding to an extension channel as a secondary channel. Conversely, the second BSS may configure a second channel band corresponding to the extension channel as a primary channel and may configure a first channel band being a remaining channel band corresponding to the legacy channel as a second channel.

A first STA 650 included in the first BSS and a second STA 660 included in the second BSS may include TX/RX blocks 670 and 680 which operate at a first channel band and a second channel band, respectively. The TX/RX blocks 670 and 680 of the first STA 650 and the second STA 660 may operate at one 80 MHz band, two non-continuous 80 MHz bands (80 MHz+80 MHz) or a 160 MHz band.

Hereinafter, it is assumed in the embodiment of the present invention that a primary channel (hereinafter referred to as 'first STA primary channel') of the first STA 650 is included in the first channel band and a primary channel (hereinafter referred to as 'second STA primary channel') of the second STA 660 is included in the second channel band. Each STA 650 or 660 may perform initial access through each STA primary channel. Remaining available channels except for the primary channel of the STA may be defined as a secondary channel of the STA. When the primary channel is expressed as the main channel and the secondary channel is expressed as a sub-channel, the STA primary channel may expressed as a primary channel.

The first STA 650 may perform channel access at a first STA primary channel of the first channel band. For example, the first STA 650 may perform channel access through a CSMA/CA back-off procedure at the first STA primary channel. The first STA 650 may perform the channel access at a first STA primary channel and may determine channel status information on a remaining first STA secondary channel band except for the first STA primary channel in order to determine whether to transmit and receive the data at another channel.

As the determination result of the first STA 650, only statuses of the first STA primary channel and the first STA secondary channel included in the first channel band may be idle and a remaining secondary channel included in the second channel band may not be idle. In this case, the first STA 650 may transmit and receive data to and from the AP 600 using only a first channel band. In this case, the PHY protocol data unit (PPDU) transmitted from the first STA 650 may include a PPDU transmitted through an 80 MHz band corresponding to a first channel band.

As the determination result of the first STA 650, a status of the secondary channel included in the first channel band and the second channel band may be idle. In this case, the first STA 650 may transmit data to and from the AP 600 using both of the first channel band and the second channel band. The PPDU transmitted from the first STA 650 may include a PPDU transmitted at two non-continuous 80 MHz bands or a PPDU transmitted at two continuous 80 MHz bands (160 MHz) according to whether the first channel band and the second channel band are a continuous channel band. It is assumed that the above operation is a case where the first STA is an extension STA to support both of a legacy channel band and an extension channel band. If the first STA is the legacy STA, the first STA may determine channel status information on only the first STA primary channel corresponding to the first channel band.

In the same manner, the second STA 660 may perform channel access at a second STA primary channel of the second channel band. For example, the second STA 660 may perform channel access through a CSMA/CA based back-off procedure at the second STA primary channel. The second STA 660 may perform channel access at the second STA primary channel to determine channel status information on a remaining second STA secondary channel band except for the second STA primary channel.

As the determination result of the second STA 660, only statuses of the second STA primary channel and the second STA secondary channel included in the second channel band may be idle but a remaining secondary channel included in the second channel band may not be idle. In this case, the second STA 660 may transmit and receive the data to and from the AP 600 using only the first channel band. In this case, the PHY protocol data unit (PPDU) transmitted from the first STA 650 may include a PPDU transmitted through an 80 MHz band corresponding to the first channel band.

As the determination result of the second STA 660, both of statuses of the secondary channel included in the first channel band and the second channel band may be idle. In this case, the second STA 660 may transmit and receive data to and from the AP 600 using both of the first channel band and the second channel band. In this case, the PPDU transmitted from the second STA 660 may include a PPDU transmitted from two non-continuous 80 MHz band or two continuous 80 MHz bands (160 MHz).

Further, it may be assumed that the first STA is a legacy STA not to support a channel of the second channel bandwidth (extension channel). In this case, the AP 600 supporting the multi-BSS operation may serve an extension STA by configuring a separate BSS supporting an extension STA at a second channel bandwidth while serving the legacy STA based on the first channel bandwidth (legacy channel). That is, the frequency efficiency may be increased by serving the first STA through the legacy channel and supporting the second STA through an extension channel.

An initial access frame (e.g., beacon frame), an authentication response frame, a probe response frame transmitted by the AP 600 when the STA firstly performs channel access, may include information on a plurality of BSSs supported from the AP.

For example, the initial access frame transmitted to the first channel band and the second channel band from the AP 600 may include information necessary when the STA operates at the first BSS and the second BSS (e.g., operation parameter).

Assuming that the first BSS is the legacy channel, a HT operation element and a VHT operation element supported from the existing IEEE 802.11a/n/ac may be used as an operation parameter for an operation of a legacy STA operating in the first BSS. The HT operation element and the VHT operation element may include information for operation in the first BSS by the STA (for example, primary channel information, secondary channel offset information, and information on the operation channel bandwidth).

Assuming that the second BSS is for the purpose of the extension STA, a multi-BSS operation element for an extension STA operated in the second BSS may be defined. The multi-BSS operation element may be transmitted while being included in the channel access frame. The multi-BSS operation element may include information on the channel band of the second BSS (e.g., channel numbers of 20 MHz primary channel, 20 MHz secondary channel, a 40 MHz secondary channel, and an 80 MHz/160 MHz secondary channel).

Hereinafter, the embodiment of the present invention discloses a detailed operation between the STA and the AP.

Figure 7:
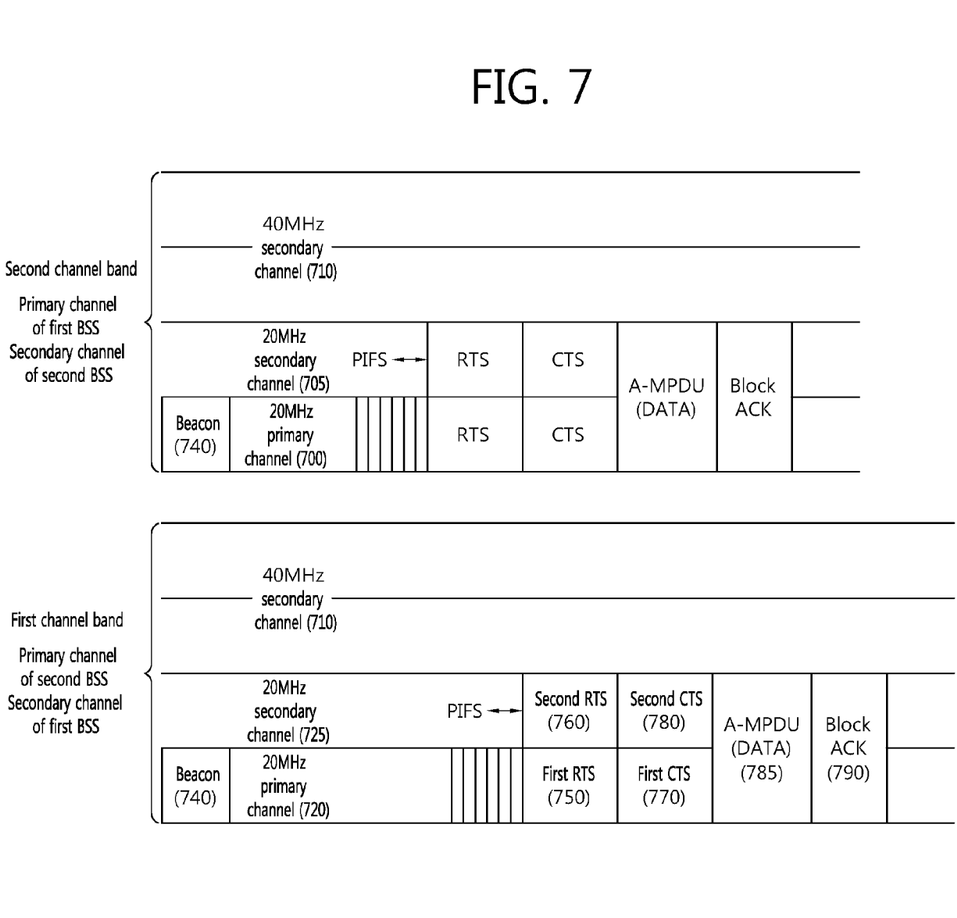
FIG. 7 is a conceptual diagram illustrating a procedure of transmitting and receiving data between a STA and an AP according to an embodiment of the present invention.

FIG. 7 is a conceptual diagram illustrating a procedure of transmitting and receiving data between a STA and an AP according to an embodiment of the present invention.

Referring to FIG. 7, one 80 MHz channel bandwidth may refer to a first channel band and a remaining one 80 MHz channel bandwidth may refer to the second channel band. It is assume that the first channel band is the legacy channel and the second channel band is an extension band. Further, for the purpose of convenience, it is assumed that the first STA is the legacy STA and the second STA is an extension STA.

It is assumed that the first BSS is a BSS where a first channel band corresponding to the legacy channel is configured as the primary channel and a second channel band being a remaining channel band corresponding to an extension channel is configured as the secondary channel. Conversely, it is assumed that the second BSS is a BSS where the second channel band corresponding to the extension channel is the primary channel and a first channel band being a remaining channel band corresponding to the legacy channel is the secondary band.

Further, the first BSS and the second BSS includes each primary channel with 20 MHz 의 STA primary channel of 20 MHz (a first STA primary channel 720 and a second STA primary channel 700). The first STA primary channel may be defined in a first BSS and the second STA primary channel may be defined in the second BSS.

The STAs included in each BSS may perform channel access based on the STA primary channels 700 and 720.

The transmission and reception of the channel access and the frame may be independently performed in the first BSS and the second BSS. For example, the AP may transmit a beacon frame 740 to a first STA primary channel 720 of the first channel band and a second STA primary channel 700 of the second channel band. The beacon frame 740 may be simultaneously or independently transmitted from the first channel bandwidth and the second channel bandwidth. The beacon frame 740 transmitted from the first channel band and a beacon frame 740 transmitted from the second channel band may include an operation parameter necessary when the STA operates in the first BSS and the second BSS.

FIG. 7 illustrates a case where the first STA access the STA primary channel 720 and the second STA accesses the second STA primary channel 700, based on the beacon frame transmitted from the AP.

The first STA may perform channel access through a CSMA/CA based back-off procedure. The first STA may perform channel access at the first STA primary channel 720 to determine channel status information on remaining first STA secondary channel bands 725 and 730 except for the first STA primary channel. The first channel band may include a first STA primary channel 720, a first STA secondary channel 725 of 20 MHz, and a first STA secondary channel 725 of 40 MHz. The first STA may determine channel status information on whether remaining secondary channels 725 and 730 except for the first STA primary channel 720 is available. As the determination result of the channel status information, the first STA may transmit RTS frames 750 and 760 to an available channel among an available first channel band.

The first STA may determine a status of the channel for a point coordination function (PCF) inter-frame space (PIFS) time before transmitting the RTS frames 750 and 760 in order to determine whether the secondary channels 725 and 730 is idle or busy. If the secondary channels 725 and 730 are idle for a PIFS time before transmitting the RTS frames 750 and 760, the first STA may determine whether a corresponding channel is available.

FIG. 7 illustrates a case where a first STA secondary channel 725 of 20 MHz is available. If the first STA secondary channel 725 of 20 MHz is available, the first STA may transmit RTS frames 750 and 760 through the first STA primary channel 720 and the first STA secondary channel 725 of 20 MHz. For example, the first RTS frame 750 transmitted through the first STA primary channel 720 and the second RTS frame 760 transmitted through the first STA secondary channel 725 may be simultaneously transmitted from the STA. The AP may transmit the first CTS frame 770 as a response to the first RTS frame 750. The AP may transmit the second CST frame 780 as a response to the second RTS frame 760. The AP may transmit CTS frames 770 and 780 being a response to the RTS frames 750 and 760 at the same channel bandwidth to which the RTS frame is transmitted based on a channel to which respective RTS frames 750 and 760 are transmitted. The AP may simultaneously transmit the first CTS frame 770 and the second CTS frame 780. The first STA may equally configure a time point when the AP transmits the first CTS frame 770 and the second CTS frame 780 based on a field (e.g., duration field) included in the RTS frames 750 and 760.

The first STA may transmit a data frame through the first STA primary channel 720 and the first STA secondary channel 725 of 20 MHz. If the first STA receives the CTS frames 770 and 780, the first STA may transmit the data frame 785. The data frame 785 transmitted from the first STA may include an aggregated MAC protocol data unit (A-MPDU) format.

The AP may receive the data frame 785 from the first STA and may transmit a block ACK 790 being a response to the data frame 785 through the first STA primary channel 720 and the first STA secondary channel 725 of 20 MHz. The first STA may equally configure a time point when the AP transmits the block ACK 790 based on a field (e.g., duration field) included in the data frame 785.

The second STA operating at the second channel band may perform uplink transmission to the AP by the above procedure. However, when the second STA is an extension STA and supports an existing legacy channel, the second STA may determine the first channel band as the second STA secondary channel to determine the status of a channel when performing a procedure of determining availability of the channel in order to transmit the RTS frame. If an available second STA second channel is included in the first channel band, a second STA secondary channel included in the first channel band may be used for uplink transmission. It is assumed in FIG. 7 that a second STA secondary channel includes only a 20 MHz secondary channel 705. The second STA may transmit data based on the second STA primary channel and the 20 MHz 제2 STA secondary channel.

A procedure between the second STA and the AP may be independently performed from a procedure between the first STA and the AP. That is, the AP may independently transmit and receive the data to and from the first STA and the second STA at the first channel band and the second channel band.

Although FIG. 7 illustrates that the STA transmit the RTS frame, when the AP perform downlink transmission, the AP may determine the availability of the channel to transmit the RTS frame to the first STA and the second STA. In this case, the RTS frame may be transmitted to the STA from the AP, and the CTS frame may be transmitted to the AP from the STA. In addition, the A-MPDU frame may be transmitted to the STA from the AP, and a block ACK may be transmitted to the AP from the STA.

That is, the AP may receive a plurality of RTS frames from a plurality of STAs through a plurality of channels, respectively, and may transmit a plurality of CTS frames to a plurality of STAs through a plurality of available channels among the plurality of channels, respectively.

The AP may receive a plurality of uplink data transmitted from the plurality of STAs through a plurality of available channels, respectively. The AP may serve the plurality of STAs based on the first BSS and the second BSS. The first BSS may include a first main channel band and a first sub-channel band and the second BSS may include a second main channel band and a second sub-channel band. As described above, the first main channel band may overlap with the second sub-channel band and the first sub-channel band may overlap with the second main channel band. The plurality of channels receiving a plurality of RTS frames from the plurality of STAs through the plurality of channels may be included in the first main channel band and the first sub-channel band.

According to another embodiment of the present invention, the AP may determine whether to perform a service to a plurality of STAs based on the RTS frame transmitted from a plurality of STAs. For example, the AP may determine to independently perform a first transmit (TX)/receive (RX) process and a second TX/RX at a specific time period with respect to the plurality of STAs on the basis of the channel status information measured based on the RTS frame.

Figure 8:
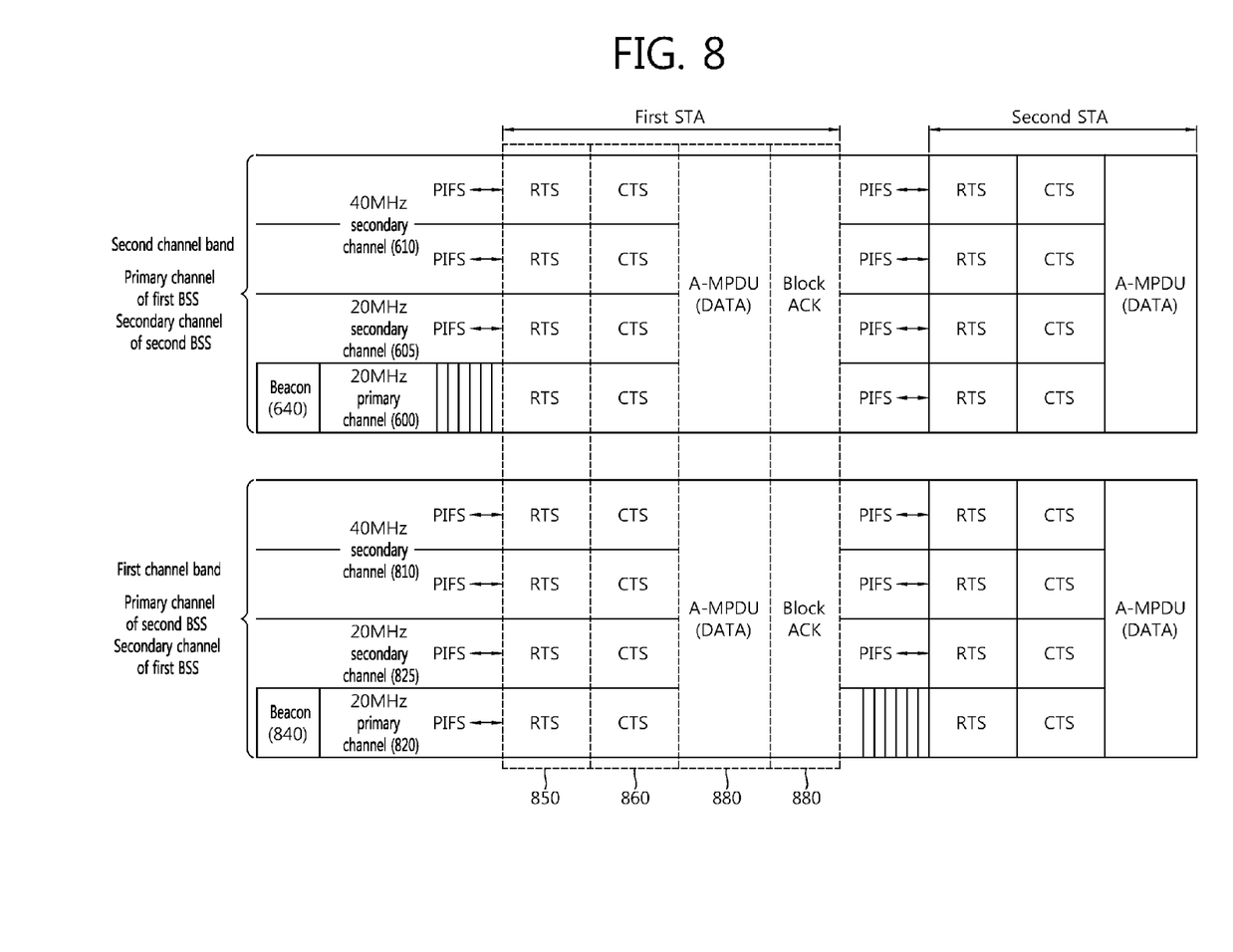
FIG. 8 is a conceptual diagram illustrating a procedure of transmitting and receiving data between a STA and an AP according to an embodiment of the present invention.

FIG. 8 is a conceptual diagram illustrating a procedure of transmitting and receiving data between a STA and an AP according to an embodiment of the present invention.

FIG. 8 illustrates on the assumption that one STA performs uplink transmission using both of the first channel band and the second channel band.

One 80 MHz channel bandwidth may refer to a first channel band and a remaining one 80 MHz channel bandwidth may refer to a second channel band. It is assumed that the first channel band is a legacy channel and the second channel band is an extension band. Unlike FIG. 7, FIG. 8 illustrates on the assumption that both of the first STA and the second STA are an extension STA.

It is assumed that the first BSS is a BSS in which a first channel bandwidth corresponding to the legacy channel is configured as the primary channel and a second channel band being a remaining channel band corresponding to the extension channel is configured as a secondary channel. Conversely, it is assumed that the second BSS is a BSS in which a second channel band corresponding to the extension channel is configured as the primary channel and the first channel band being a remaining channel band corresponding to the legacy channel is configured as the secondary channel. In detail, the first BSS and the second BSS includes 20 MHz STA primary channel (a first STA primary channel 820 and a second STA primary channel 800) in each primary channel. STAs included in each BSS may perform channel access based on the STA primary channels 800 and 820.

The first STA may perform channel access by performing a back-off procedure at the first STA primary channel 820. The first STA may determine channel availability with respect to a remaining secondary channel 20 MHz first STA secondary channel 825, a 40 MHz first STA secondary channel 830, a 80 MHz first STA secondary channel (second channel band) after a back-off timer is terminated. Since the first STA is an extension STA, the first STA may determine channel availability with respect to both of the first channel band and the second channel band.

In order to determine the availability of the first STA secondary channel, the first STA may determine whether the first STA secondary channel is idle or busy. The first STA may determine whether a status of the channel is idle for a PIFS time to transmit the RTS frame 850. The first STA may determine a channel in an idle status for a PIFS time among the first STA secondary channels as an available channel to transmit the RTS frame to the available channel. The first STA may perform 40 MHz/80 MHz/160 MHz/80+80 MHz transmission according to which first STA secondary channels are idle. A 160 MHz channel band represents a case where the first channel band and the second channel band continue.

FIG. 8 illustrates on the assumption that all first STA secondary channels are available. When all the first STA secondary channels are available, the first STA may transmit the data frame 870 using both of the first channel band and the second channel band.

When the AP supports transmission of a 80 MHz channel bandwidth at the first channel band and the second channel band, the AP may support 160 MHz/80+80 MHz using both of the first channel band and the second channel band.

In this case, the first STA may transmit the RTS frame 850 through the first channel band and the second channel band. The AP may transmit a CTS frame 860 as a response to the RTS frame 850. The CTS frame 860 transmitted through the first STA primary channel 820 and the first STA secondary channel (20 MHz secondary channel 825, 40 MHz secondary channel 830, second band) by the AP may be configured to be transmitted at the same time. The first STA may configure a transmission time point of the CTS frame 860 based on a field (e.g., duration field) included in the RTS frame 850.

If the first STA receives the CTS frame 860 from the AP, the first STA may transmit the data frame 870 to the AP. The first STA may equally configure a start time point and an end time point of transmission of the data frame 870 transmitted through the first STA primary channel and the first STA secondary channel. If the AP receives the data frame 870 from the first STA, the AP may transmit a block ACK 880 to the first STA as a response with respect to the data frame 870. A time point of transmitting the block ACK 880 through the first STA primary channel and the first STA secondary channel may be equally configured.

In the side of the second STA, since the first STA uses the first channel band and the second channel band for a predetermined period, the first STA may determine that the channel is not available at a corresponding period. In detail, while the first STA included in the first BSS transmits and receives the data to and from the AP using both of the first channel band and the second channel band, it may be determined that the second channel band being a primary channel band of the second BSS is busy. Accordingly, the second STA included in the second BSS defers a back-off mechanism at a channel access procedure. After transmission from the first STA is terminated, the second STA included in the second BSS may perform channel access using a back-off mechanism at the second STA primary channel 800 of the second BSS during the same procedure. The second STA may determine channel availability of the first channel band and the second channel band of the second BSS to determine a channel for transmitting the data frame. FIG. 8 illustrates a case where all of the 20 MHz second STA secondary channel 805, a secondary channel 830 of a 40 MHz second STA, and a secondary channel (first channel band) of the 80 MHz second STA. The second STA may transmit the data frame to the AP by performing the same procedure as that of the above first STA and the AP.

Figure 9:
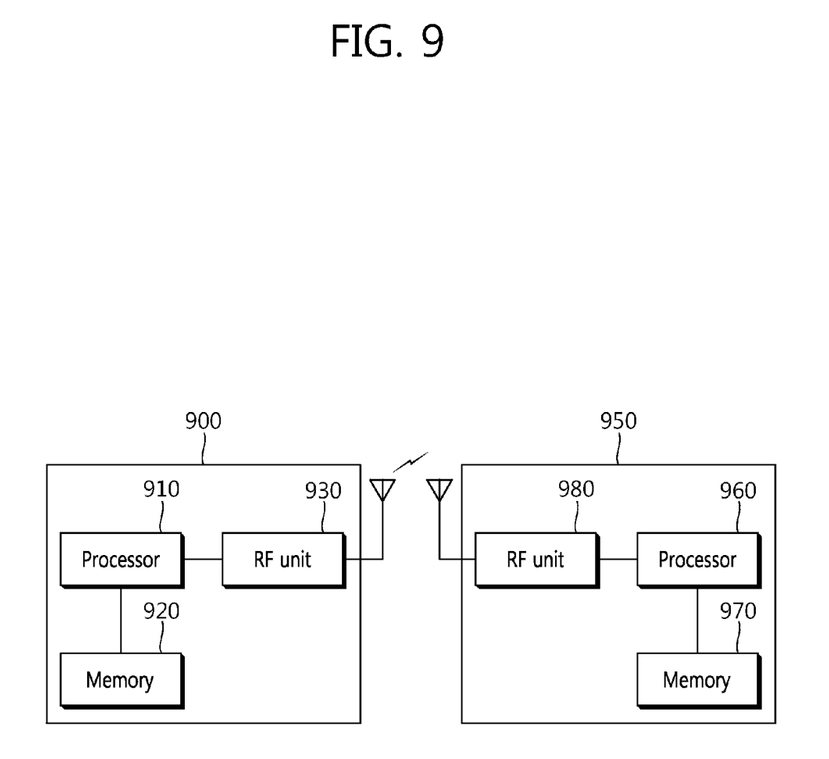
FIG. 9 is a block diagram illustrating a wireless apparatus according to an embodiment of the present invention.

FIG. 9 is a block diagram illustrating a wireless device to which an embodiment of the present invention may apply.

Referring to FIG. 9, the wireless device may be an STA that may implement the above-described embodiments, and the wireless device may be an AP 950 or a non-AP STA (or STA) (900).

The STA 900 includes a processor 910, a memory 920, and an RF (Radio Frequency) unit 930.

The RF unit 930 may be connected with the processor 920 to transmit/receive radio signals.

The processor 920 implements functions, processes, and/or methods as proposed herein. For example, the processor 920 may be implemented to perform the operation of the above-described wireless device according to an embodiment disclosed in FIG. 6 to FIG. 8 of the present invention.

For example, the processor 920 may access the AP by executing back-off based on the BSS including each STA among a plurality of BSSs implemented by the AP.

The AP 950 includes a processor 960, a memory 970, and an RF (Radio Frequency) unit 980.

The RF unit 980 may be connected with the processor 960 to transmit/receive radio signals.

The processor 960 implements functions, processes, and/or methods as proposed herein. For example, the processor 960 may be implemented to perform the operation of the above-described wireless device according to an embodiment disclosed in FIG. 6 to FIG. 8 of the present invention.

For example, the processor 960 may receive a plurality of RTS frames from a plurality of STAs through a plurality of channels, and may receive a plurality of CTS frames to the plurality of STAs through a plurality of available channels among the plurality of channels. Further, the processor 960 may be configured to receive a plurality of uplink data frames transmitted from a plurality of STAs through a plurality of available channels.

Further, the processor 960 may be configured to communicate with a plurality of STAs based on the first BSS and the second BSS. The first BSS may include a first main channel band and a first sub-channel band. The second BSS may include a second main channel band and a second sub-channel band. The first main channel band may overlap with the second sub-channel band. The first sub-channel band may overlap with the second main channel band. A plurality of channels may be included in the first main channel band and the first sub-channel band.

The processor 920 may include an ASIC (Application-Specific Integrated Circuit), other chipset, a logic circuit, a data processing device, and/or a converter that performs conversion between a baseband signal and a radio signal. The memory 940 may include a ROM (Read-Only Memory), a RAM (Random Access Memory), a flash memory, a memory card, a storage medium, and/or other storage device. The RF unit 960 may include one or more antennas that transmit and/or receive radio signals.

When an embodiment is implemented in software, the above-described schemes may be embodied in modules (processes, or functions, etc.) performing the above-described functions. The modules may be stored in the memory 920, 970 and may be executed by the processor 910, 960. The memory 920, 970 may be positioned in or outside the processor 910, 960 and may be connected with the processor 910, 960 via various well-known means.

What is claimed is:

1. A communication method for an access point (AP) in a wireless local area network (WLAN), the method comprising:

receiving, by the AP including a first module for a first basic service set (BSS) and a second module for a second BSS, a plurality of request to send (RTS) frames from each of a plurality of STAs through each of a plurality of channels, wherein the first module and the second module are separately used for communication between the AP and the plurality of STAs;

transmitting, by the AP, a plurality of clear to send (CTS) frames to the plurality of STAs through each of a plurality of available channels among the plurality of channels; and receiving, by the AP, a plurality of uplink data frames transmitted from each of the plurality of STAs through each of the plurality of available channels, wherein the AP communicates with the plurality of STAs based on the first BSS and the second BSS, wherein the first BSS includes a first main channel band and a first sub channel band, wherein the second BSS includes a second main channel band and a second sub channel band, wherein the first main channel band overlaps with the second sub channel band and the first sub channel band overlaps with the second main channel band, and wherein the plurality of channels are included in the first main channel band and the first sub channel band.

2. The method of claim 1, wherein the plurality of STAs include a first STA and a second STA, wherein the first STA is included in the first BSS, wherein the second STA is included in the second BSS, and wherein the plurality of RTS frames include a first RTS frame transmitted by the first STA at the first main channel band and a second RTS frame transmitted by the second STA at the second main channel band.

3. The method of claim 2, further comprising determining whether the AP independently performs a first transmit (TX)/receive (RX) process and a second TX/RX process with respect to the plurality of STAs at a specific time period based on the plurality of RTS frames, wherein the first TX/RX processes the plurality of CTS frames and a frame transmitted and received between the first STA and the AP at the first main channel band among the plurality of uplink data frames, and wherein the second TX/RX processes the plurality of CTS frames and a frame transmitted and received between the second STA and the AP at the second main channel band among the plurality of uplink data frames.

4. The method of claim 2, further comprising transmitting, by the AP, a plurality of beacon frames, wherein the plurality of beacon frames include a first beacon frame transmitted from a first primary channel of the first main channel band and a second beacon frame transmitted from a second primary channel of the second main channel band, wherein each of the first beacon frame and the second beacon frame includes information on the first primary channel and information on the second primary channel, wherein the first primary channel is a channel in which the first STA performs back-off, and wherein the second primary channel is a channel in which the second STA performs the back-off.

5. The method of claim 1, wherein each of the first main channel band and the first sub channel band is a 80 MHz frequency band.

6. An access point (AP) performing downlink transmission in a wireless local area network (WLAN), the AP comprising:

a radio frequency (RF) unit configured to transmit and receive a radio signal;

a processor configured to:

receive a plurality of request to send (RTS) frames from each of a plurality of STAs through each of a plurality of channels, transmit a plurality of clear to send (CTS) frames to the plurality of STAs through each of a plurality of available channels among the plurality of channels, and receive a plurality of uplink data frames transmitted from each of the plurality of STAs through each of the plurality of available channels, wherein the AP includes a first module for a first basic service set (BSS) and a second module for a second BSS, wherein the AP communicates with the plurality of STAs based on the first BSS and the second BSS, wherein the first BSS includes a first main channel band and a first sub channel band, wherein the second BSS includes a second main channel band and a second sub channel band, wherein the first main channel band overlaps with the second sub channel band and the first sub channel band overlaps with the second main channel band, wherein the first module and the second module are separately used for communication between the AP and the plurality of STAs, and wherein the plurality of channels are included in the first main channel band and the first sub channel band.

7. The AP of claim 6, wherein the plurality of STAs include a first STA and a second STA, wherein the first STA is included in the first BSS, wherein the second STA is included in the second BSS, and wherein the plurality of RTS frames include a first RTS frame transmitted by the first STA at the first main channel band and a second RTS frame transmitted by the second STA at the second main channel band.

8. The AP of claim 7, wherein the processor is further configured to determine whether the AP independently performs a first transmit (TX)/receive (RX) process and a second TX/RX process with respect to the plurality of STAs at a specific time period based on the plurality of RTS frames, wherein the first TX/RX processes the plurality of CTS frames and a frame transmitted and received between the first STA and the AP at the first main channel band among the plurality of uplink data frames, and wherein the second TX/RX processes the plurality of CTS frames and a frame transmitted and received between the second STA and the AP at the second main channel band among the plurality of uplink data frames.

9. The AP of claim 7, wherein the processor is further configured to transmit plurality of beacon frames, wherein the plurality of beacon frames include a first beacon frame transmitted from a first primary channel of the first main channel band and a second beacon frame transmitted from a second primary channel of the second main channel band, wherein each of the first beacon frame and the second beacon frame includes information on the first primary channel and information on the second primary channel, wherein the first primary channel is a channel in which the first STA performs back-off, and wherein the second primary channel is a channel in which the second STA performs the back-off.

10. The AP of claim 6, wherein each of the first main channel band and the first sub channel band is a 80 MHz frequency band.

* * * * *